United States Patent Office 2,805,958
Patented Sept. 10, 1957

2,805,958
PREPARATION OF HYDROPHOBIC SILICAS

Arthur M. Bueche and Curtis S. Oliver, Schenectady, N. Y., assignors to General Electric Company, a corporation of New York No Drawing. Application March 8, 1955, Serial No. 493,072

4 Claims. (Cl. 106—308)

This invention relates to hydrophobic silicas and to the method of their preparation. More particularly, this invention relates to a process of producing hydrophobic silicas which comprises treating silicas with alcohols in the presence of a hydrohalic acid.

In Patent 2,657,149—Iler (hereinafter called Iler's process), there is disclosed a surface esterification process for rendering silicas hydrophobic (i. e. they do not absorb or adsorb water). The hydrophobic silicas described therein are powders or pulverulent materials having an internal structure of inorganic siliceous materials to which —OR groups are chemically bound, R being the hydrocarbon radical containing 2 to 18 carbon atoms. The hydrophobic character of these silicas permits better dispersion of the powder in organic media than can be obtained with hydrophilic silicas, for where properties of a composition are dependent upon the detailed interaction of silicas with the surrounding organic medium, these properties can be appreciably altered by a hydrophobic surface. Thus, hydrophobic silicas are useful as fillers for rubbers and plastics, as wax additives, grease additives, paint additives, etc. Furthermore, as described in my copending application Serial No. 462,599, filed October 15, 1954 and assigned to the same assignee as the present application, organopoly-siloxanes containing these hydrophobic silicas can be cured without the usual vulcanization agents, such as peroxides, azo compounds, etc.

In the process of preparing hydrophobic silicas, as disclosed in Iler's process, strong acids and alkalies were considered undesirable because they affected the stability of both reagents and products. Therefore, the patentee recommended that water washings be used as a means of removing soluble acidic or basic materials from the silicas prior to alcohol treatment followed by a pH adjustment to the range of 2 to 9 and preferably to the range of 5 to 8.

In Iler's process, esterification was effected by azeotropic distillation, with large amounts of the esterifying alcohol being used as the azeotropic agent. In this process, it was recommended that the reaction be carried out at a temperature of 130° C. or higher because below this temperature only by using an extremely long reaction time could the reaction proceed at a practical rate. Furthermore, it was stated that when a temperature below 100° C. was used, no true esterification was effected.

We have now discovered that hydrophobic silicas can be prepared by treating silicas with alcohols in the presence of such strong acids as hydrohalic acids. The significance of this discovery is that hydrophobic silicas can be prepared within a short time, at low temperatures, with such small amounts of alcohol that the reaction mixture is a free flowing powder.

In general, the process is carried out by reacting silica with an alcohol in the presence of a hydrohalic acid. A convenient manner of adding the hydrohalic acid to the reaction mixture is to dissolve it in the alcohol prior to mixing with the silica. In lieu of solution in the alcohol, the acid can be absorbed on the silica, if desired. The hydrohalic acid may be gradually removed by distillation during the course of the reaction or removed after the reaction is completed. Thereupon, excess alcohol is removed from the reaction to leave a free flowing hydrophobic powder. During the reaction the surface —SiOH groups of the siliceous starting material are esterfied so as to form surface —SiOR' groups where R' is alkyl.

According to my process, hydrophobic silicas can be prepared from a large number of alkanols, such as methyl, ethyl, propyl, butyl, amyl, heptyl, hexyl, octyl, nonyl, decyl, octadecyl, etc., alcohols, and other members of the homologous series as well as their isomers may be used to surface estrify silicas. The groups supplied by alkanols render silicas hydrophobic by reacting with the silica surface so as to produce alkoxy groups chemically bound to the surface silicon atoms. This process is applicable to any composition having an exposed finely divided silica surface of one or more square meters per gram. The most preferable are those having a surface area between 4–400 or more square meters per gram.

The silicas that can be rendered hydrophobic by our process are compositions containing at least an exposed surface of silica. Since the process of rendering silica hydrophobic is essentially a surface reaction, it is immaterial what the sub-surface of said silica contains, although substantially homogeneous silicas are preferred. By a silica surface, we mean an exposed layer of silicic acid in various states of dehydration, or stated another way, $SiO_2$ in various states of hydration. The surface should contain —SiOH groups or silicas which are convertible to such groups during the alcohol treatment. As the specific silica surface area increases (i. e. square meters of surface per gram), a larger number of —SiOH groups are present on the surface, thus increasing the alkalysilicon ratio in the alkanol-treated product. Compositions having a high alkyl-silicon ratio are preferred.

The preparation of high surface area silicas and the chemical changes that occur when silicic acid goes to silica gel or hydrated silica are described in "Natural and Synthetic High Polymers," by K. M. Meyer, page 85 (1942), and in Hurd, "Chemical Reviews," vol. 22, No. 3, page 403 (1938).

A class of silicas useful for our invention are those having numerous pores or voids therein. These porous materials having exposed surfaces within the particles so that liquids and gases can penetrate to the surfaces of the pore walls are three-dimensional networks whose surfaces are extended by open pores.

A typical method of preparing precipitated silica comprises precipitating silica by the addition of $H_2SO_4$ to a sodium silicate solution and working the gel relatively free of salts with water. If the water is evaporated from the gel in this state, the latter shrinks considerably in volume due to the force exerted on the solid phase of the gel by the surface tension of the liquid as it recedes in the pores of the material. These materials, which are called xerogels, can be used in this process.

In contrast to xerogels, aerogels are composed of the original solid phase gel in substantially the same condition as while filled with the swelling liquid. Aerogels are conveniently made by raising the gel to the critical temperature of the liquid contained therein while maintaining the pressure on the system sufficiently high to insure that the liquid phase will remain liquid until the critical temperature is reached. At this point, the liquid will be converted into the gaseous state without the formation of menisci at the gas-liquid interface. The degree of porosity may be controlled to a large degree by controlling the concentration of the silica in the gel as it is precipitated. These aerogels may be used in this condition or they may be ground to a finer state of subdivision. An example of an aerogel is Santocel-CS marketed by Monsanto Chemical Company which has a specific surface area of 100–200 square meters per gram.

In addition to the porous precipitated silicas described above, finely divided, less porous silicas can also be used. These finely divided silicas are usually prepared by burning various siliceous compounds. For example, fumed silica can be prepared by burning $SiCl_4$, an example of which is known as either "Cab-O-Sil" or "Aerosil" (sold by Godfrey Cabot Co., Inc., Boston, Massachusetts) which silica has a surface area of about 200 square meters per gram. Another finely divided silica can be prepared by burning silicate esters, as described in U. S. Patent 2,399,687—McNabb. Still another finely divided silica powder is that produced by Linde Air Products Co. and described in "Chemical Engineering" 54, 177 (1947), which silica has a specific surface area of 240 square meters per gram. Many other silicas will be apparent to those skilled in the art.

The hydrophobic character of the product is tested in the following manner: (1) behavior in boiling water, (2) behavior in a toluene-water system. In contrast to the initial siliceous material which could be dispersed throughout the aqueous medium, the surface-esterified product floats on the aqueous surface when stirred into boiling water. When unesterified silica is added to a cylinder containing a layer of toluene supernatant on water, it falls through the toluene layer and becomes dispersed into the lower aqueous layer. In contrast, surface-esterified silica, when stirred into the mixture, remains dispersed in the upper toluene layer. These tests demonstrate the change from a hydrophilic (i. e. do absorb or adsorb water) to a hydrophobic material upon esterification.

Very small amounts of alcohols can be used in our process for rendering silicas hydrophobic. In reacting any specific silica with any specific alcohol, the stoichiometry of the reaction should be considered, i. e., the equivalent weight of alcohol as compared to —SiOH groups exposed on the surface. We have found that as little as 6.25 grams of butanol (0.083 mole) were sufficient to render hydrophobic a 100-gram sample of silica aerogel, such as Santocel-CS having a surface area of 100–200 meters per gram. This alcohol —HCl— silica reaction mixture was a free flowing powder. The economic advantage of using such small quantities of alcohol is evident.

Of the hydrohalic acids, HCl, HBr, and HI can be used, HCl being preferred. To keep the reaction medium sufficiently acidic at least $1.4 \times 10^{-3}$ mol or more of halohalic acid per 100 grams of alcohol should be employed (0.05 gram in the case of HCl), preferably 3 to $6 \times 10^{-3}$ mol or more. Very highly saturated solutions may also be used if desired. To keep the water content low, gaseous hydrohalic acids are preferred.

This reaction can be carried out from as low a temperature as 65° C. to 150° C. but preferably 75–100° C. Although the reaction may be carried out up to about 200° C., it is not advisable to run the reaction at a higher temperature than 150° C. because the hydrophobic silica product is less stable above this temperature. Either atmospheric, super- or sub-atmospheric pressure can be used. A slight sub-atmospheric pressure would facilitate removal of the hydrohalic acid during the reaction. A super-atmospheric process is desirable with low boiling alcohols, such as methanol.

Small amounts of excess alcohol are generally removed by distillation, but if a large excess of alcohol is present, it can be removed by filtration, centrifugation, distillation or a combination of the three. With high boiling alcohols, it is advantageous to remove these alcohols such as chloroform, ether, etc., and to evaporate the solvent from the hydrophobic powder. Reduced pressure is valuable in removing the last traces of both hydrohalic acid and alcohol.

In order that those skilled in the art may better understand how the present invention may be practiced, the following examples are given by way of illustration and not by way of limitation. All parts are by weight.

To 4 parts of silica aerogel (Santocel-CS) was added 1 part of n-butanol containing various amounts of HCl. The mixture was stirred until the silica was intimately mixed with the alcoholic HCl. The mixture at this point was still a free flowing powder. The mixture was then heated (90–100° C.) for about 1–3 hours under conditions which minimize the loss of n-butanol while still allowing the escape of HCl gas. This was accomplished by having a small opening at the top of the reactor. Thereupon, n-butanol and any remaining HCl was removed by distillation so as to leave a hydrophobic, free flowing powder.

The hydrophobicity of the resulting silica was determined by (1) the boiling water and (2) toluene-water system tests above described.

Table I shows the various amounts of HCl that were used.

TABLE I

| Example | Grams HCl/ 100 grams n-butanol | Silica after Treatment |
| --- | --- | --- |
| 1 | 5 | Hydrophobic. |
| 2 | 1.4 | Do. |
| 3 | 0.6 | Do. |
| 4 | 0.36 | Do. |
| 5 | 0.20 | Do. |
| 6 | 0.10 | Do. |
| 7 | 0.05 | Do. |

Hydrophobic silicas also resulted when the above procedures (using the same quantities as used in Examples 1–7) were repeated at various temperatures from 75–150° C.

*Example 8*

100 parts of silica aerogel (Santocel-CS) were heated (90–100° C.) with 6.25 parts of n-butanol containing 0.4 gram of HCl for about 3 hours in the manner described for the first 7 examples. The mixture at this point was still a free flowing powder. Unreacted HCl and n-butanol were removed under reduced pressure. The product was hydrophobic as determined by both the boiling water and toluene-water system above described.

*Example 9*

Hydrophobic propyl-esterified silica aerogel (Santocel-CS) can be prepared in the manner of Examples 1–7 at a temperature of 70–75° C. using n-propyl alcohol in place of n-butanol.

What we claim as new and desire to secure by Letters Patent of the United States is:

1. A process of preparing hydrophobic silica which comprises treating silica having a surface area of 4–400 sq. meters per gram with an aliphatic monohydric alcohol in the presence of a hydrohalic acid selected from the group consisting of hydrogen chloride, hydrogen bromide and hydrogen iodide at a temperature of 65° to 100° C., said silica remaining a free-flowing powder throughout the process.

2. The process of claim 1 in which the hydrohalic acid is hydrogen chloride.

3. The process of claim 1 in which the alcohol is butanol and the hydrohalic acid is hydrogen chloride.

4. The process of claim 1 in which the alcohol is propanol and the hydrohalic acid is hydrogen chloride.

References Cited in the file of this patent

UNITED STATES PATENTS

| | | |
| --- | --- | --- |
| 2,443,093 | Brunn et al. | June 8, 1948 |
| 2,470,562 | Hyde | May 17, 1949 |
| 2,657,149 | Iler | Oct. 27, 1953 |